US008387909B2

(12) United States Patent
Galgano et al.

(10) Patent No.: US 8,387,909 B2
(45) Date of Patent: Mar. 5, 2013

(54) WIRE AND CABLE DISPENSING CONTAINER AND SYSTEMS

(75) Inventors: Richard Galgano, Naperville, IL (US); Mark K. Winkel, Indian Head Park, IL (US); Martin C. McGuire, Burr Ridge, IL (US); Martin J. McGuire, Downers Grove, IL (US)

(73) Assignee: Windy City Wire Cable and Technology Products, LLC, Bolingbrook, IL (US)

( * ) Notice: Subject to any disclaimer, the term of this patent is extended or adjusted under 35 U.S.C. 154(b) by 0 days.

(21) Appl. No.: 13/410,575

(22) Filed: Mar. 2, 2012

(65) Prior Publication Data

US 2012/0160952 A1 Jun. 28, 2012

Related U.S. Application Data

(63) Continuation of application No. 13/206,053, filed on Aug. 9, 2011, which is a continuation of application No. 12/564,600, filed on Sep. 22, 2009, now Pat. No. 8,157,201, which is a continuation of application No. 12/103,790, filed on Apr. 16, 2008, now Pat. No. 8,016,222.

(51) Int. Cl.
*B65H 16/02* (2006.01)
*B65H 49/38* (2006.01)
(52) U.S. Cl. .................. 242/594.4; 242/588.6
(58) Field of Classification Search ............... 242/614.1, 242/608, 588, 588.3, 588.6, 598.5, 596, 596.7, 242/596.8, 128, 129, 129.51, 129.53, 403, 242/594.3, 594.4, 533.8, 131, 131.1; 206/389, 206/395–397, 403–405, 408, 409, 413–416
See application file for complete search history.

(56) References Cited

U.S. PATENT DOCUMENTS

| 2,822,992 | A | * | 2/1958 | Moulden ................ 206/394 |
| 3,051,306 | A | * | 8/1962 | Lowe et al. ............ 242/564 |
| 3,412,847 | A | | 11/1968 | Wise et al. |
| 3,680,810 | A | | 8/1972 | Jarmalow |
| 3,693,784 | A | | 9/1972 | Holmes |
| 3,854,509 | A | | 12/1974 | Bailey |
| 4,077,586 | A | * | 3/1978 | Thomas et al. ......... 242/129.5 |
| 4,202,509 | A | * | 5/1980 | Horn ................... 242/593 |
| 4,367,853 | A | | 1/1983 | Kotzur |
| 4,406,419 | A | | 9/1983 | Kotzur |
| 4,444,313 | A | | 4/1984 | Tyson |
| 4,451,010 | A | | 5/1984 | Meyer |
| 4,477,033 | A | | 10/1984 | Kotzur et al. |
| 4,723,821 | A | | 2/1988 | Montgomery |
| 4,741,495 | A | | 5/1988 | Kotzur |
| 5,222,683 | A | | 6/1993 | Blackshire |

(Continued)

FOREIGN PATENT DOCUMENTS

EP  1 564 175  * 8/2005
WO  WO 02/085753  * 10/2002

OTHER PUBLICATIONS

Wire Caddy, Cable Reel Stands—Quick Spooler, downloaded from http://www.quickspooler.coml on Jul. 14, 2009.

(Continued)

*Primary Examiner* — William A Rivera
(74) *Attorney, Agent, or Firm* — Momkus McCluskey, LLC; Jefferson Perkins

(57) ABSTRACT

A system for dispensing electrical communications cable includes first and second containers of wire or cable wound on reels placed inside respective first and second cartons. The first and second cartons are disposed to be adjacent one another and a clear passageway extends completely through the cartons, the reels, and any internal support structures in the cartons that support the reels. An elongate rod is disposed in the clear passageway and extends at least from the left panel of the first carton to the right panel of the second carton.

5 Claims, 12 Drawing Sheets

U.S. PATENT DOCUMENTS

| | | | |
|---|---|---|---|
| 5,409,181 | A | 4/1995 | Patrick |
| 5,529,186 | A | 6/1996 | Bass |
| 5,551,647 | A | 9/1996 | Browning |
| 5,704,479 | A | 1/1998 | Barnett et al. |
| 5,775,621 | A | 7/1998 | Sauber |
| 5,967,451 | A | 10/1999 | Radaios |
| 6,003,667 | A | 12/1999 | Barnett et al. |
| 6,234,421 | B1 | 5/2001 | Cox et al. |
| 6,523,777 | B2 | 2/2003 | Gaudio |
| 6,640,975 | B2 | 11/2003 | Bennett et al. |
| 6,805,417 | B2 | 10/2004 | Kocienski |
| 7,025,300 | B2 | 4/2006 | Glassey |
| 7,204,452 | B2 | 4/2007 | Wilkinson et al. |
| 7,311,285 | B2 | 12/2007 | Rauchs et al. |
| 7,347,395 | B2 | 3/2008 | Hom |
| 8,016,222 | B2 * | 9/2011 | Galgano et al. ............... 242/557 |
| 2002/0125161 | A1 | 9/2002 | Cote |
| 2003/0080011 | A1 | 5/2003 | You et al. |
| 2005/0035240 | A1 | 2/2005 | Weck et al. |
| 2006/0038053 | A1 | 2/2006 | Giovannoni |
| 2008/0191436 | A1 | 8/2008 | Galgano et al. |
| 2011/0048992 | A1 | 3/2011 | Galgano et al. |

OTHER PUBLICATIONS

Welcome to Quickspooler.com ((((((How the Quickspooler was invented)))))), downloaded from http://www.quickspooler.com/QS.html on Jul. 14, 2009.

Cable Pull Stands, Cable Caddy, Rope Stand, downloaded from http://cableorganizer.com/cable-pull-stands/ on Jul. 14, 2009.

Hand Caddy, Data Cable Caddy, GL-9520, Greenlee 9520, downloaded from http://cableorganizer.com/greenlee/hand-caddy/ on Jul. 14, 2009.

Cable Reel Rollers, Wire Spool Caddies & Wire Reel Carts, downloaded from http://www.wctproducts.com/cable_reel_menu.htm on Jul. 14, 2009.

Cable Spool Caddy, Wire Spool Caddy & Wire Spool Carts, downloaded from http://www.wctproducts.com/reel_caddy_page.htm on Jul. 14, 2009.

Paige 1 Pac, downloaded from http://www.paigeelectric.com/onepac.html on Jul. 14, 2009.

BELDEN/8800/Hook-Up Wire Dispenser Rack (Only / Newark.com, downloaded from http://www.newark.com/belden/8800/hook-up-wire-dispenser-rack-only/dp/20M4466 on Jul. 14, 2009.

JONARD/WD-30-Y/Wire Dispenser/Newark.com, downloaded from http://www.newark.com/jonard/wd-30/wire-dispenser/dp10F7539 on Jul. 14, 2009.

Fiber in a Box, AFL Fiber in a Box, Berktek Fiber in a Box, Wholesale Fiber Optic Cable in a . . . , downloaded from http://www.americantechsupply.com/aflfiberinabox.htm on Jul. 14, 2009.

HOTS Jun. 2003, downloaded from http://www.wireville.com/hots/hotsJune03.html on Jul. 14, 2009.

Genesis Cat5 Cable, 1000 Foot Roll in Box—WG-4978210x—SmartHomeUSA.com, downloaded from http://www.smarthomeusa.com/ShopByManufacturer/Genesis/Item/WG-4978210x/ on Jul. 14, 2009.

Fiber Reel-in-Box Cost Savings Analysis, downloaded from http://www.superioressex.com/uploadedFiles/News/Case_Studies/fiber-reel-in%20box.pdf on Jul. 17, 2009.

Carris Reels 10 Caddy, downloaded from http://www.carris.com/products/caddy10.html on Oct. 1, 2009.

Carris Reels Plastic Reels, downloaded from http://www.carris.com/plasticreels.html on Oct. 1, 2009.

Carris Reels Home Page, downloaded from http://www.carris.com/index.html on Oct. 1, 2009.

About TLE Mfg./dba Reels-USA, downloaded from http://reels-usa.com/ on Oct. 1, 2009.

Examiner's Requisition issued by the Canadian Intellectual Property Office on Oct. 26, 2010 in Canadian Patent Application No. 2,646,964.

* cited by examiner

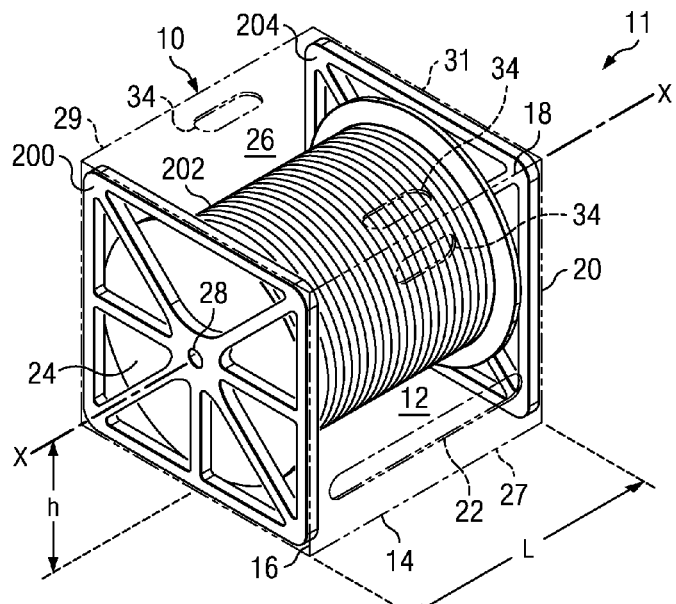
FIG. 1
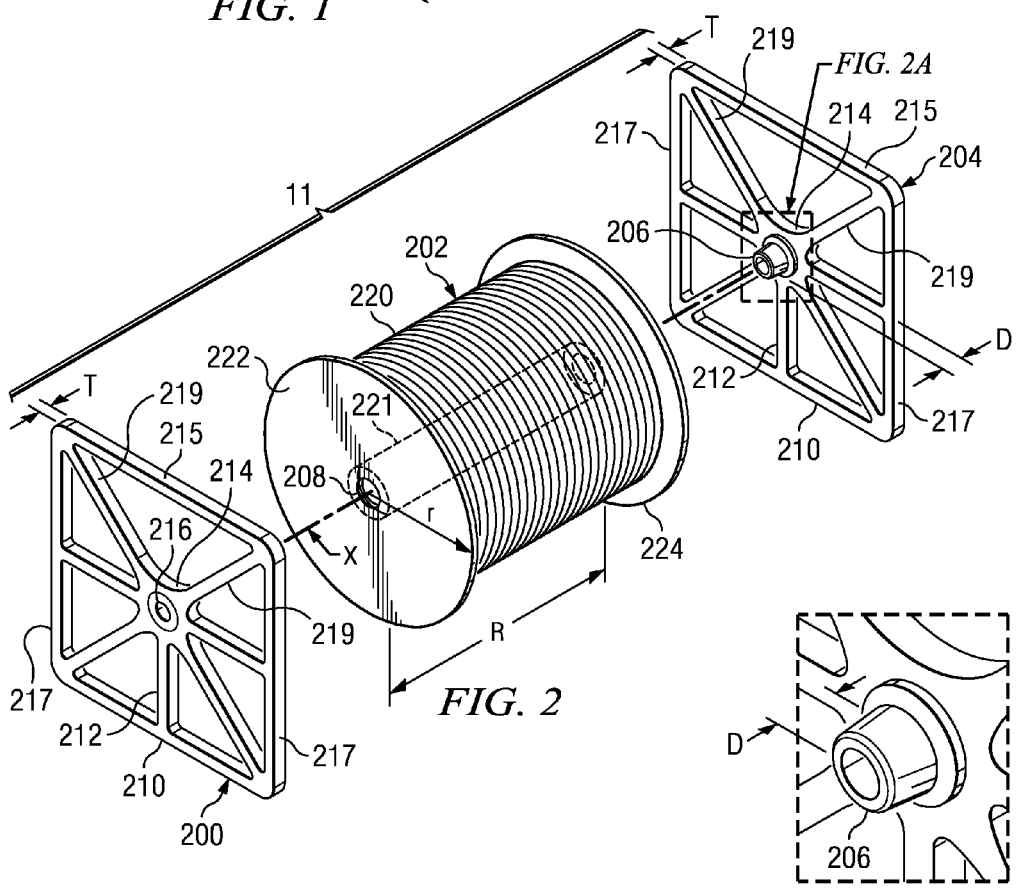
FIG. 2
FIG. 2A

WIRE AND CABLE DISPENSING CONTAINER AND SYSTEMS

RELATED APPLICATIONS

This application is a continuation of U.S. patent application Ser. No. 13/206,053, filed Aug. 9, 2011, which is a continuation of U.S. patent application Ser. No. 12/564,600, filed Sep. 22, 2009, which is a continuation of U.S. patent application Ser. No. 12/103,790, filed Apr. 16, 2008, the specification and drawings of which are fully incorporated by reference herein.

BACKGROUND OF THE INVENTION

Wire and cable for installation in residences and buildings typically comes on cable reels. The types of wire and cable so provided are numerous, and include 110V three-conductor wire, "Romex", and many different kinds of low-voltage, multiconductor insulated communications cable, such as that used for setting up Ethernet networks, intercom systems, entertainment systems and the connection of security sensors and devices. A new building under construction will need many kinds of these cables, and several reels of cable will be used by an installer on-site.

One known technique is to provide coils of such cable in boxes, and to create a hole in a front or top panel of the (typically cardboard) box for pulling out a desired length of cable. This conventional method has a drawback in that the cable may kink inside of the box or otherwise resist being pulled out of the box to such an extent that a cable installer or technician finds that he or she is pulling the box across the floor. Oftentimes the installer has to install several different lengths of cable on a single run. To do this, the installer has had to identify which kinds of cable he or she needs, individually pull cable out of separate boxes and estimate as best as he or she can the amount of cable so pulled.

These boxes of cable are heavy and it takes some effort to move them around. In complex jobs it is easy for one needed box of cable to become physically dissociated from one or more other boxes of cable that will supply lengths of different cable for the same run. A need therefore persists for more efficient methods and apparatus for dispensing cable.

SUMMARY OF THE INVENTION

One aspect of the invention provides a container for the dispensing of electrical or communications cable wound on a cable reel. The container includes a carton having a bottom panel with left and right sides, an upstanding left panel of the carton joined to the left side of the bottom panel, and an upstanding right panel joined to the right side of the panel. A cable reel is disposed in the carton and includes an elongate spindle on which electrical or communications cable is wound. The spindle has opposed left and right ends and is adapted to rotate around a horizontal axis that is spaced from and parallel to the bottom panel of the carton.

A left support extends from the bottom panel for rotatably supporting the left end of the cable spindle to be off of the bottom panel of the carton. Similarly, a right support extends from the bottom panel for rotatably supporting the right end of the cable spindle. A continuous axial passageway is formed through the left panel of the carton, the left support, the spindle, the right support and the right panel of the carton, such that the container may be affixed to another structure by means of inserting an elongate connecting rod through the axial passageway.

Containers according to the invention may be assembled together and attached to carts, or wheel trucks, from which lengths of several different cables may be withdrawn at the same time. The containers may include pass-through slots in the top and bottom panels, which allow cable to be passed vertically from a lower container and through an upper container. This facilitates the installation of the cables in overhead areas.

In another aspect, a system for dispensing electrical or communications cable comprises a first container, a second container, and an elongate rod. The first container includes a first carton having a first bottom panel with left and right sides. An upstanding first left panel of the first carton is joined to the left side of the first bottom panel, and an upstanding first right panel is joined to the right side of the first bottom panel.

A first cable reel includes an elongate first spindle on which electrical or communications cable is wound. The first spindle has opposed left and right ends and is adapted to rotate around a horizontal axis, which is spaced from and is parallel to the first bottom panel of the first carton. A first left support is disposed to be above the first bottom panel for rotatably supporting the left end of the first cable spindle off of the first bottom panel of the first carton. A first right support is disposed to be above the first bottom panel for rotatably supporting the right end of the first cable spindle.

A second container includes a second carton having a second bottom panel with left and right sides. An upstanding second left panel of the second carton is joined to the left side of the second bottom panel, and an upstanding second right panel is joined to the right side of the second bottom panel.

A second cable reel includes an elongate second spindle on which electrical or communications cable is wound. The second spindle has opposed left and right ends and is adapted to rotate around the horizontal axis. A second left support is disposed to be above the second bottom panel for rotatably supporting the left end of the second cable spindle off of the second bottom panel of the second carton. A second right support is disposed to be above the second bottom panel for rotatably supporting the right end of the second cable spindle.

The right panel of the first container is disposed to be proximate to the left panel of the second container. A clear passageway is formed around the horizontal axis and through the first left panel of the first carton, the first left support, the first spindle, the first right support, the first right panel of the first carton, the second left panel of the second carton, the second left support, the second spindle, the second right support, and the second right panel of the second carton. An elongate rod is disposed through the clear passageway and extends at least from the first left panel of the first carton to the second right panel of the second carton.

BRIEF DESCRIPTION OF THE DRAWINGS

Further aspects of the invention and their advantages can be discerned in the following detailed description, in which like characters denote like parts and in which:

FIG. 1 is an isometric view of a single container or carton according to the invention, in which an outer carton wall is shown in phantom to reveal internal components;

FIG. 2 is an exploded view of a cable reel and support caddies used in the container shown in FIG. 1;

FIG. 2A is a detail of FIG. 2 showing a preferred caddy bushing;

FIG. 9 is an isometric view of two stacked cartons according to an further embodiment of the invention, showing the function of vertical cable pass-through;

DETAILED DESCRIPTION

Figure 3:
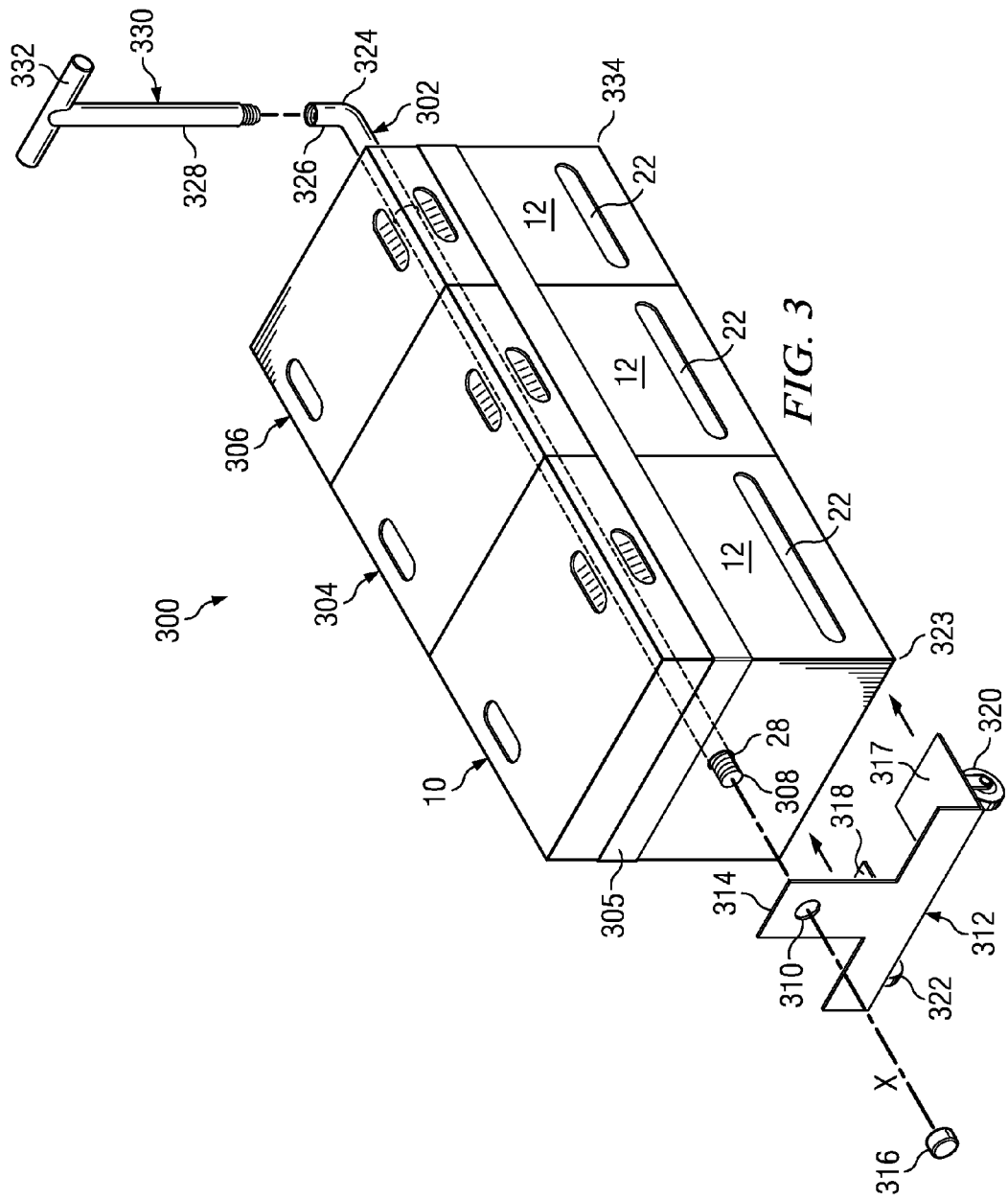
FIG. 3 is an exploded isometric view of a first mobile cable dispensing system according to the invention, made up in part of cartons similar to those shown in FIGS. 1 and 2.

FIGS. 1 and 2 show a cable reel carton indicated generally at 10, which in turn forms the exterior components of a cable reel container 11. Carton 10 is preferably formed of a single sheet of corrugated cardboard and includes a front panel 12 having a bottom side 14, a left side 16, a top side 18 and a right side 20. The front panel 12 preferably has, in a lower portion thereof, an elongate die-cut cable dispensing or payout slot 22 through which cable or wire may be pulled. The slot 22 is elongate in a direction parallel to a cable reel axis X and is long enough to permit cable to come off the reel at right angles to the reel axis and through the slot 22, no matter where on the reel the cable is presently being unspooled. Preferably the length of the slot 22 is selected to be at least roughly the same as the distance between the internal surfaces of the two cable reel flanges (described below).

Carton 10 also includes a left panel 24 which extends rearwardly from side 16 and at right angles to the front panel 12, and a top panel 26 which extends rearwardly from top side 18 and at right angles to the front panel 12 and left panel 24. The carton 10 is completed by a bottom panel 27, a rear panel 29 and a right panel 31, the last of which is a mirror image of the left panel 24. An arbor hole 28 is formed in left panel 24 around the horizontal axis X, axis X being a predetermined distance h from an upper surface of the carton bottom panel 27. The cable payout slot 22 is preferably positioned well below the axis X in order to better approximate the point of departure of the cable from the reel, which will be at some nonzero radius from the axis X. Alternatively the cable payout or dispensing slot 22 could be positioned above axis X. Payout slot 22 may be defined by a closed line of perforations in corrugated cardboard front panel 12. In this instance, container 11 would be shipped with the payout slot 22 closed. At the installation site, the installer would open slot 22 by punching out the perforation.

Figure 9:
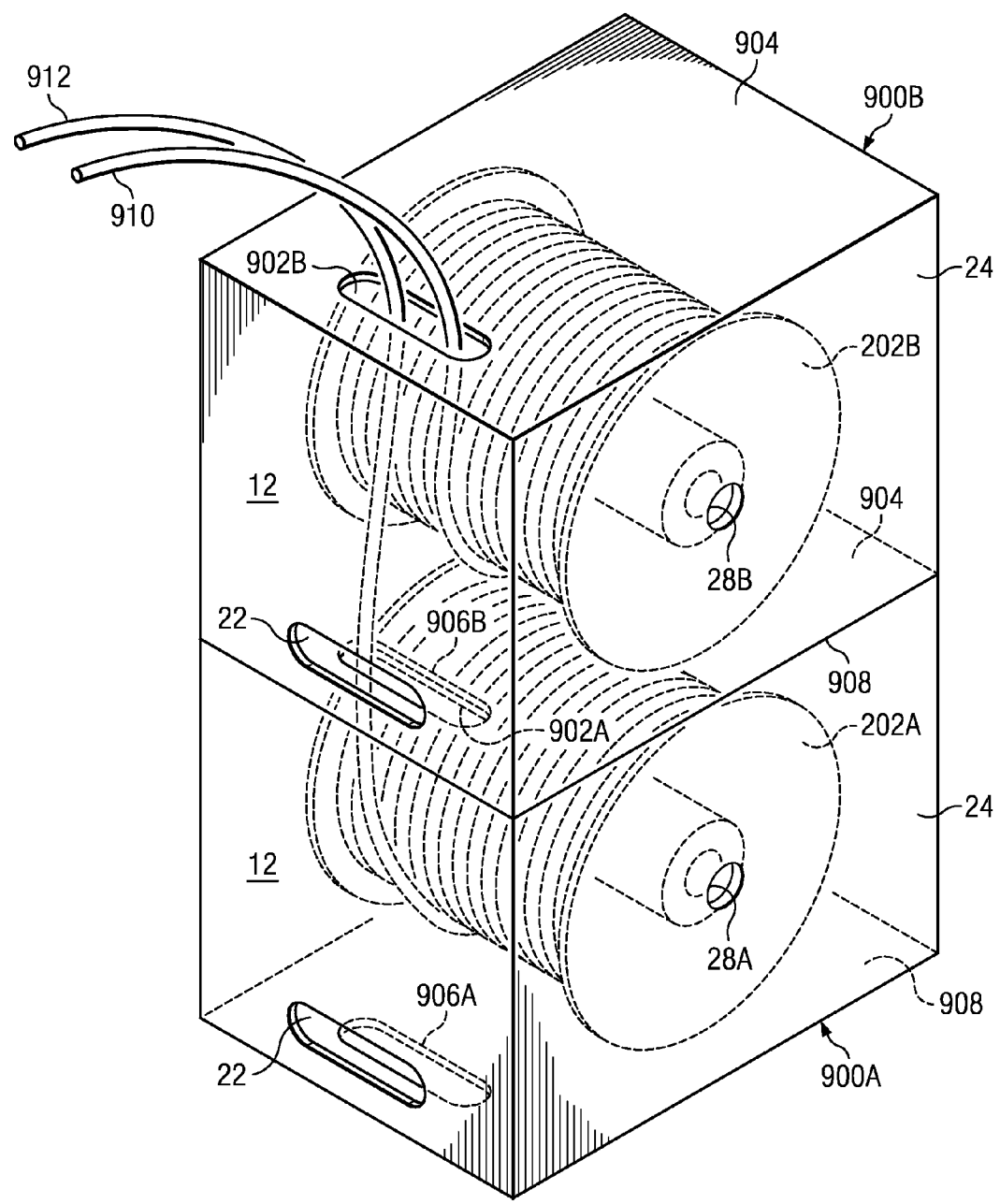

Conveniently, handholes 34 may be die-cut into the cardboard panels 12, 26, 29 for ease in handling. In alternative embodiments the cable payout slot 22 can be repeated in top panel 26 and/or rear panel 29, so as to give the user some flexibility in arranging the cartons in the mobile unit or on the cart (later described) and some ability to select how the cable will exit the carton 10. An embodiment in which the carton has elongate pass-through slots in both the top and bottom panels is described in conjunction with FIG. 9.

The interior components of container 11 are shown in exploded view in FIG. 2. A preferably spoked left caddy 200 is, in use, disposed interiorly adjacent an inner surface of the left carton panel 24. Caddy 200 may be injection-molded from a tough plastic that at the least is capable of suspending half of the weight of a full cable reel 202 without buckling A right caddy 204 can be formed from the same mold as the one which makes left caddy 200. In use, the right caddy or reel support member 204 is positioned interiorly adjacent an inner surface of the right carton panel 31.

As best seen in FIG. 2A, each caddy 200, 204 has a substantially cylindrical bushing 206 which extends axially from a general plane in which the remainder of caddy 200, 204 is formed toward the other caddy. The bushing 206 could be formed from a surface of rotation other than a straight cylinder; it could, for example, have a terminal lip of increased radius that would run in an annular groove (not shown) in the reel flange central hole 208. Such a departure from a straight cylinder could allow the caddies 200, 204 to be snapped to the cable reel 202. In the illustrated embodiment the bushing surface 206 is slightly tapered toward its free end and has a terminal curved or rounded surface. For the purpose of defining the surface of bushing 206 as "substantially cylindrical", these departures from a perfect mathematical cylinder are to be included in the definition. The taper and terminal curved or rounded surface aid in registering the bushing 206 within the reel flange central holes 208.

Since caddies 200, 204 are preferably molded of a hard plastic, the surfaces of bushings 206 tend to have a low amount of friction and can be used without augmentation. In alternative embodiments, the bushings 206 can be either coated or sleeved to present surfaces which have an even lower coefficient of friction relative to the cable reel which is rotatably mounted between them. On the other hand, some resistance to rotation of the reel 202 around axis X is desirable, as this mitigates against the spinning of the reel 202 in the absence of tension on the cable being withdrawn. Were reel 202 to continue to spin a long time without such tension, the cable 220 could spool off of the reel 202 inside of the carton 10.

The caddies or cable reel support members 200, 204 have bodies which generally conform in two dimensions to the interior of the carton 10 into which they are designed to be placed, and in general will be of slightly smaller dimension than, but will conform to the shape of, left box panel 24 and right box panel 31. To save weight it is preferred that the caddies 200, 204 be spoked instead of be solid plates. The caddies 200, 204 suspend between them a reel 202 of cable that can weigh many dozens of pounds. Accordingly it is preferred that each caddy 200, 204 have a horizontal base member 210 which is meant to rest on an upper surface of bottom carton panel 27. A central, vertically oriented spoke 212 can be formed to extend from the base member 210 to a central portion 214, from which in turn bushing 206 extends. The spokes 212 will bear most of the weight of the reel 202. Preferably each caddy has a top rail or horizontal member 215 which in use is disposed adjacent an internal surface of top panel 26 of the carton 10. The top rail 215 can in turn be supported by side rails 217 and angled spokes 219. The top rail 215 is useful in accepting a columnar load imposed by other reel containers 11 placed on top of the particular reel container 11 of which the caddies 200, 204 are a part. Such container stacking occurs in the use of the cart illustrated in FIGS. 5 and 6 and described below, and also in the embodiment discussed in conjunction with FIGS. 9-12. In one embodiment (not shown) the spoke 212 is duplicated in a vertical spoke collinear with it which extends from axis X to the top rail 215.

Preferably the panels of carton 10, the caddies 200, 204, the cable reel 202 and the bushings 206 are so sized that the carton interior prevents the reel 202 from coming off of the bushings 206. The carton 10 will have an internal length L in between the internal surfaces of side panels 24 and 31. Most of the distance L will be occupied by the reel 202, which has a predetermined length R between external surfaces of the reel flanges 222, 224. Each caddy 200, 204 will have a general body thickness T. The bushings 206 extend inwardly from the general interior surfaces of the caddies 200, 204 by a distance D. Preferably, the dimensions of these components are selected such that 2T+R is slightly less than L. On the other hand, 2T+R30 2D should be somewhat greater than L, such that the cable reel 202 is forced to ride on the bushings 206 while the caddies 200, 204 and the reel 202 are inside of the carton 10. This dimensioning would not be necessary in those embodiments in which the caddies are snapped or otherwise affixed to the reel 202 prior to the insertion of all three components into a carton or box 10. Further, there will be variations in reel lengths according to the amount and kind of cable wound thereon. In at least many cases, the caddies 200, 204 will be used in many different carton sizes, so that dimension L of the carton 10 should closely follow cable reel length R.

The cable reel 202 is preselected to have a flange radius r which is smaller than axis height h. This will ensure that the reel 202 can rotate freely inside of carton 10 on bushings 206.

Each caddy 200, 204 has a central hole 216 sized to receive an axial support rod (later described) therethrough. Each reel 202 has an axial passageway 221 that joins together reel flange central holes 208. Conveniently this axial passageway 221 can be formed by an interior volume of a tube which also bears the wound cable 220 on its exterior surface. As assembled and in the condition shown in FIG. 1, each carton 10 therefore has a free passageway all the way along axis X from one side of the box 10 to the other, including a left arbor hole 28, central hole 216 in caddy 200, central hole 208 in left cable reel flange 222, a central passageway between left cable reel flange 222 and right cable reel flange 224, a central hole 216 in right caddy 204, and an arbor hole 28 in the right carton panel 31.

In many instances a user or installer will wish to pull the same length of different kinds of cable at the same time, usually to be installed along the same run. FIG. 3 illustrates a first cart or vehicle 300 which makes this very convenient to do. The center or backbone of the cart 300 is made up by a rigid support rod or pipe 302 that can be formed of tubular steel and in any event is strong enough to withstand buckling when supporting a hundred pounds or more of weight. The support rod 302 is threaded through the arbor holes 28, central caddy holes 216 and reels 202 of each of a plurality of cartons 10, 304 and 306 (three shown in FIG. 3). The unit 300 can be formed of containers having different lengths in an axial direction. The length of the axial rod 302 used is preselected to be a little longer than the combined exterior axial length of cartons 10, 304 and 306, which are arranged along rod 302 to abut each other and preferably to present front faces or panels 12 in the same direction (although one or more could be reversed). After the user or cable supplier selects cartons 10, 304, 306 which are to be combined, they can be taped together with tape 305 or the like to better unify them such that they will not rotate around axis X independently of each other.

A base end 308 of the rod 302 is preferably threaded and is received into a hole 310 in a wheel truck or base 312. An upstanding panel 314 of the wheel truck 312 is affixed between a left panel 24 of an end carton 10 and a cap 316, which screws onto the base end 308 of the rod 302. In an alternative embodiment (not shown), rod 312 may have opposed holes drilled through the sidewall of rod 302, at right angles to and intersecting rod 302's axis, near base end 308. These holes would receive a cotter pin or clevis of the kind described elsewhere herein. The wheel truck 312, which conveniently can be fabricated of a single piece of sheet steel, further has at least one horizontal panel 317 (in the illustrated embodiment, there are two such panels 317 and 318) which receive a lower left corner 323 of the leftmost carton 10. Separate casters 320, 322 may be affixed by welding or riveting to lower surfaces of the horizontal panels 317 and 318. Once carton 10 has been received by horizontal panels 317 and 318, the three cartons 10, 304 and 306 will be prevented from rotating around axis X.

A front end 324 of the axial rod 302 is fitted with or formed to have an ell 326 which may be internally threaded. The ell 326 threadably accepts a vertical member 328 of a handle 330 which may have a horizontal member 332 at its top end. After assembly, an installer can move unit 300 from place to place by pulling up on handle 330. Half of the weight of the unit 300 will be borne by wheel truck 312. The installer may set down the unit 300 such that axial rod 302 is at about right angles to the direction of cable pull. Casters 320, which preferably are of the nonturning type (that is, they stay in alignment with axis X), and the forward corner 334 of carton 306 will exhibit enough friction with the floor surface that the unit 300 will resist being drawn in the direction of the cable pull.

Figure 4A:
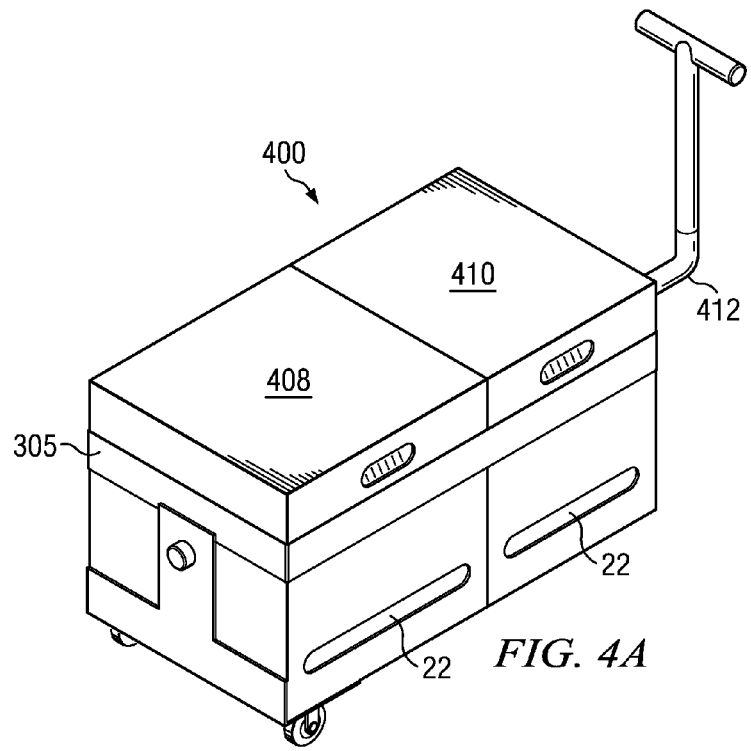
FIGS. 4A-4D are variations on the system shown in FIG. 3, in which the size and number of joined cartons is varied.
Figure 4B:
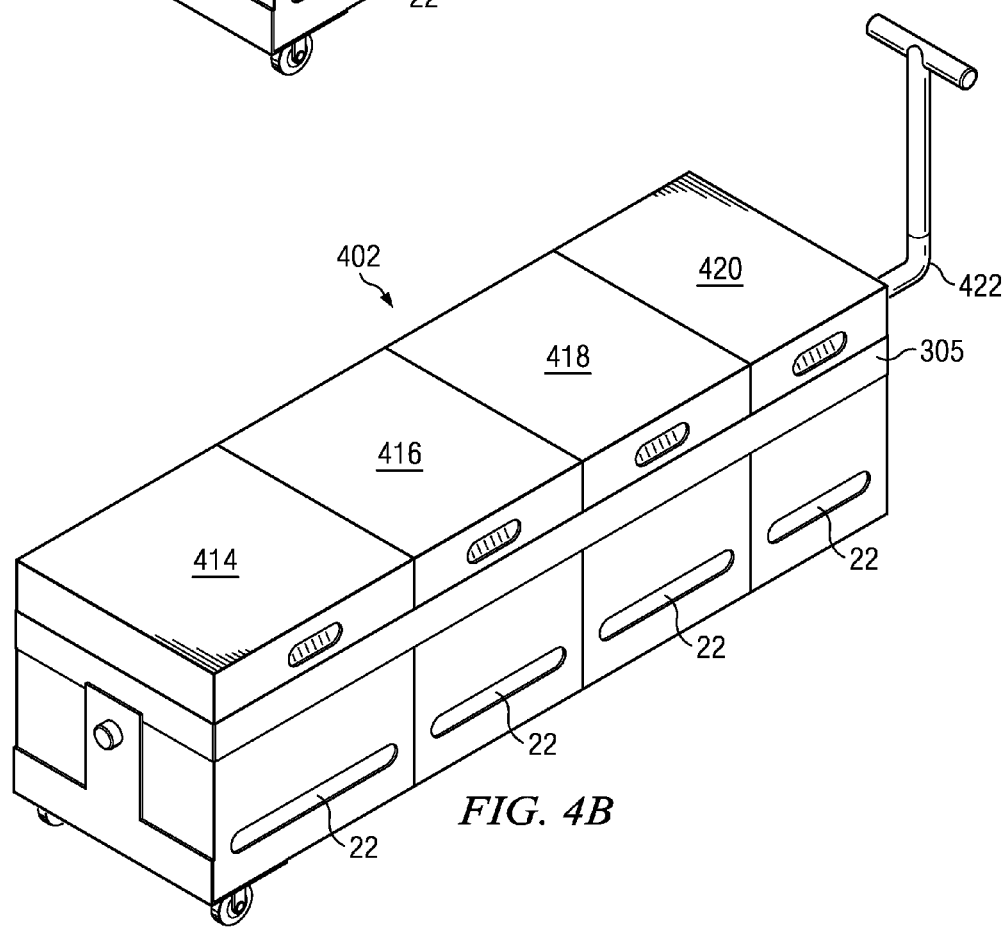
Figure 4C:
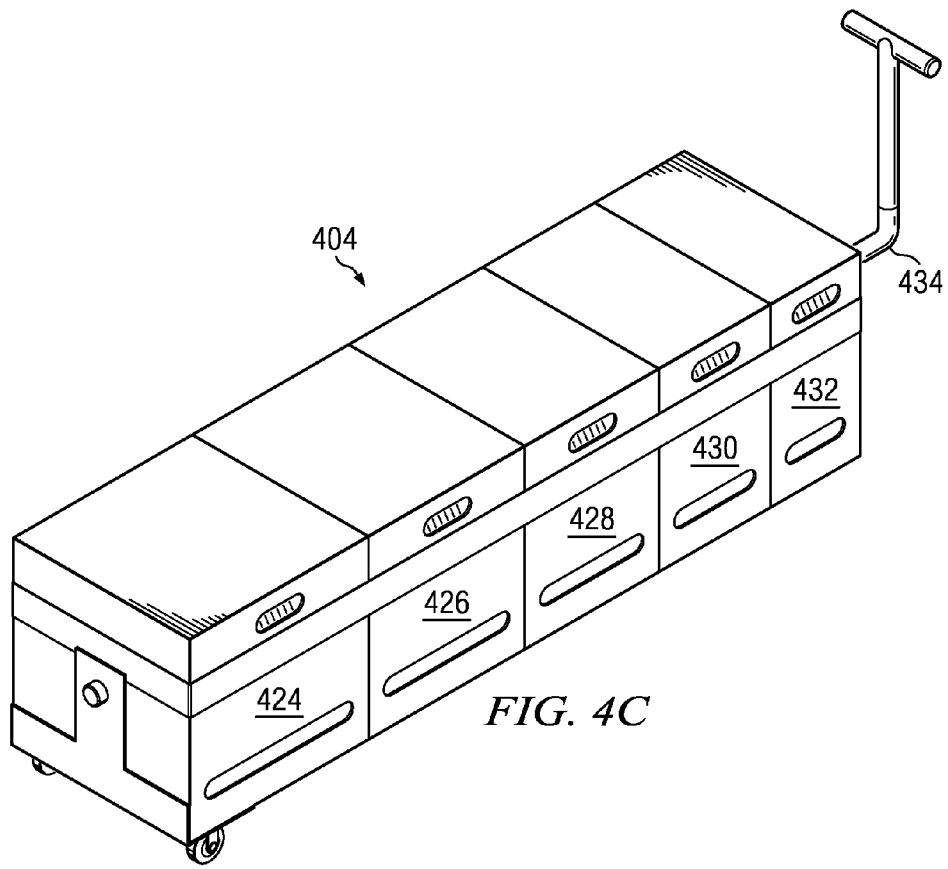
Figure 4D:
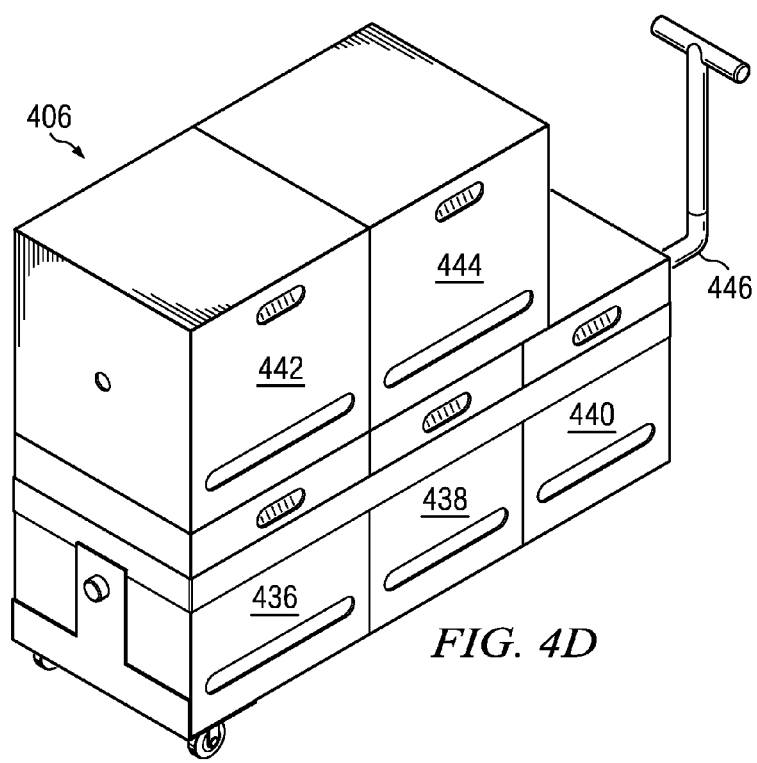

FIGS. 4A-4D show variations on how integrated mobile multicontainer units 400, 402, 404 and 406 may be assembled. Unit 400 is composed of just two containers 408, 410. The containers 408 and 410 may be of different lengths, as would be the case where cable of smaller length or thickness was being stored in container 410 than in container 408. A relatively short axial support rod 412 is selected for assembling the unit 400. In contrast, unit 402 (FIG. 4B) is assembled from four reel containers 414-420 and a longer axial support rod 422. A five-container unit 404 is shown in FIG. 4C, as composed of containers 424-432 and an even longer axial support rod 434. FIG. 4D shows a unit 406 in which containers 436-440 are assembled together as supported by axial support rod 446, while additional containers 442, 444 are mounted on top of containers 436-440.

Figure 5:
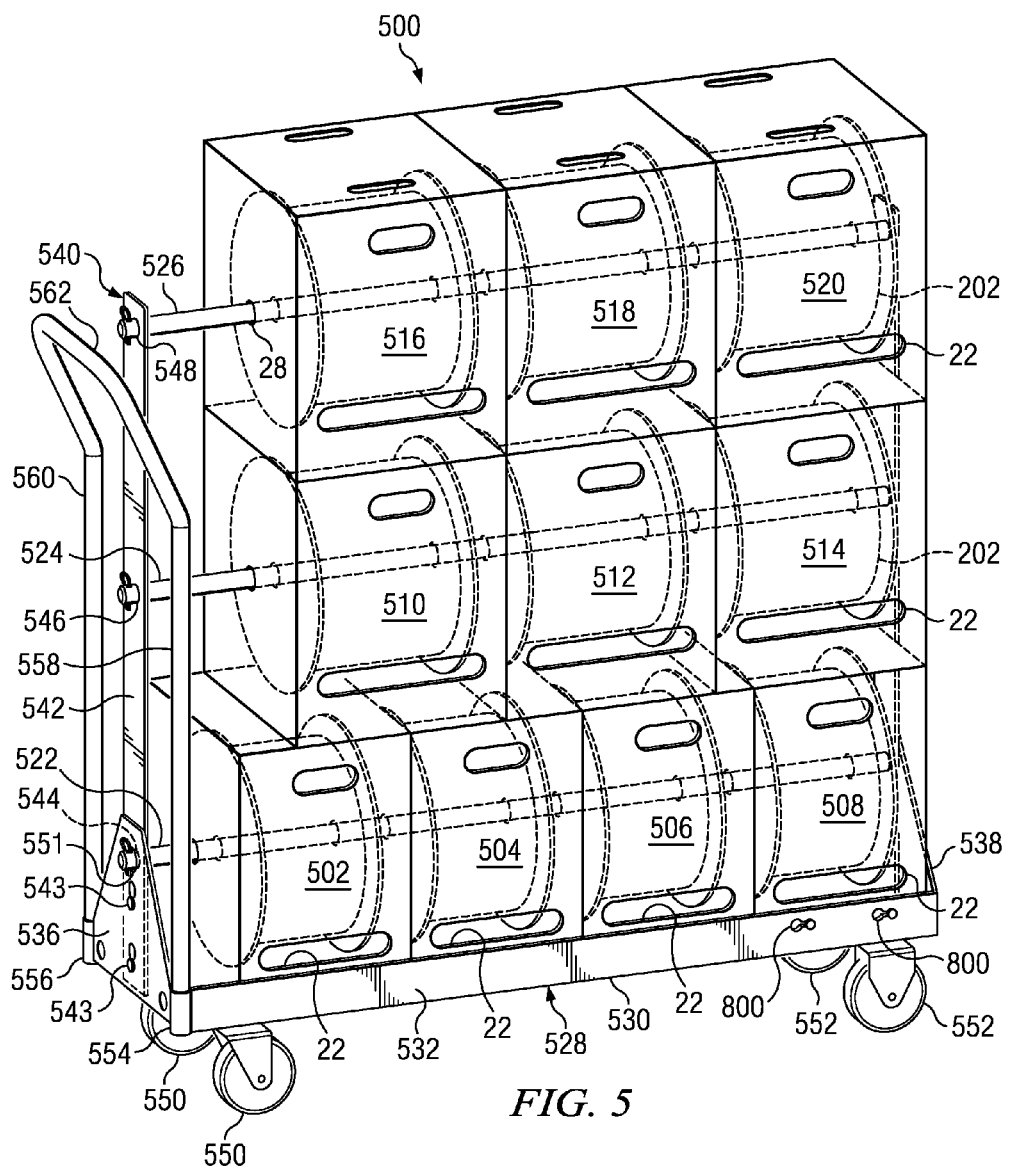
FIG. 5 is an isometric view of a second mobile cable dispensing system according to the invention, as including a cart.
Figure 6:
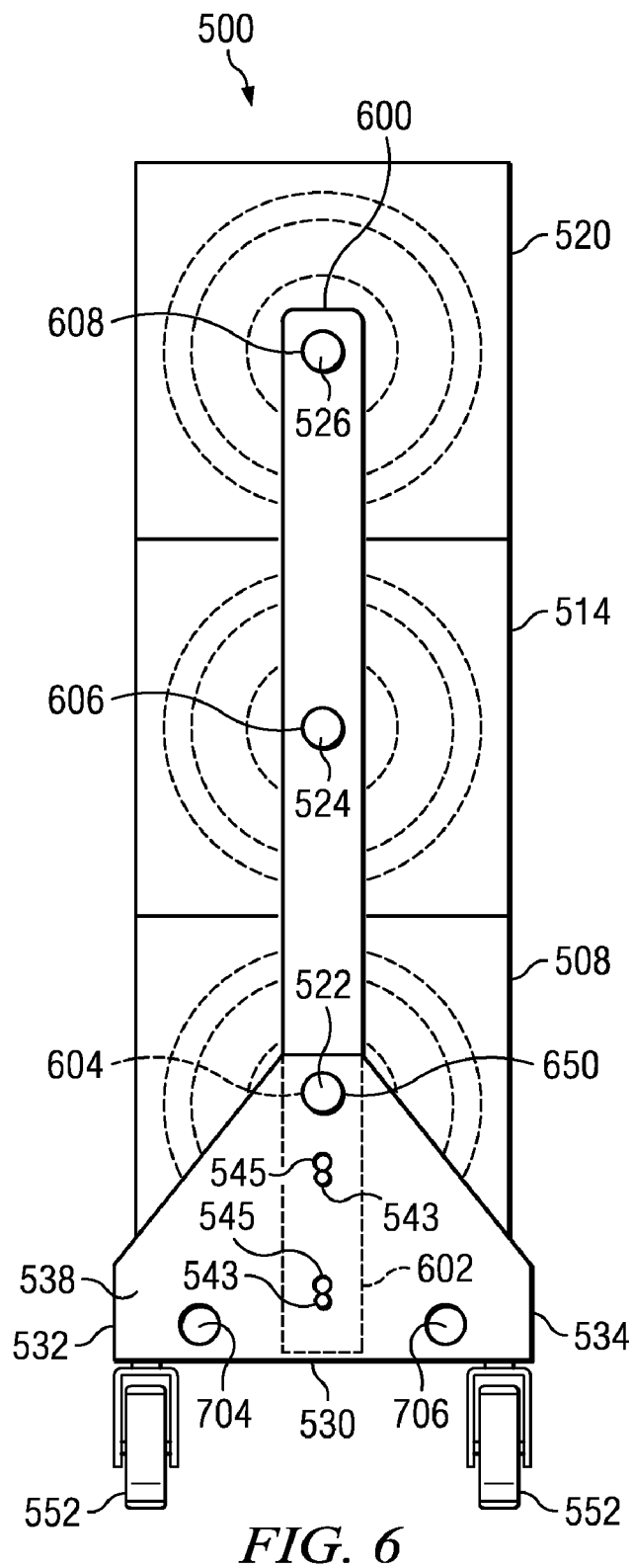
FIG. 6 is a rear end view of the cart shown in FIG. 5.

FIGS. 5-8 show a four-wheeled cart 500 to which containers 502-520 can be mounted in up to three parallel rows, one each for respective axial support rods 522, 524 and 526. The support rods 522-526 are preferably parallel to but vertically spaced apart from each other so as to each be coaxial with a respective row of containers through which they are inserted. FIG. 5 shows cart 500 in a use configuration; when not in use it may be collapsed to a storage configuration, as explained in conjunction with FIG. 8. The cart 500 is built on an elongate rectangular frame 528 which has a bottom plate 530, left and right side panels or plates 532 and 534 which extend upwardly from the longitudinal edges of bottom panel 530 and which are preferably orthogonal to panel 530, and front and rear panels 536 and 538 which extend upwardly from the transverse edges of bottom panel 530 and preferably are orthogonal to plates 530-534 and parallel to each other. Panels 530-538 can be formed from a single blank of sheet steel and together form a shallow box sized to receive the first row of reel containers 502-508. The height of left side panel 532 is chosen to be somewhat less than the height of cable payout slots 22 above the bottom panels of the containers 502-508, such that the cables being withdrawn from slots 22 will not be occluded or abraded by the side panel 532. The height of right side panel 534 can be preselected to be taller than this, or can be the same height, in case that the installer chooses to face the slots 22 (or even just some of them) the opposite way.

A vertical, elongate, preferably flat front support rod holder 540 can have its lower end 542 affixed as by riveting or welding to front panel 536. The front support rod holder more preferably is affixed to the front panel 536 by flat-headed studs 543 formed to extend from a front flat surface of holder 540 and keyed slots 545 formed in panel 536 which have top openings sized and shaped to receive therethrough a head of a respective stud 543, and a slot depending from this opening which accepts only a shaft of the stud 543. Other user-operable fasteners such as pins or nuts and bolts could alternatively be employed. As assembled to cart 500, the front support rod holder 540 extends upwardly from the front panel 536 at least beyond the horizontal level of the third and highest support rod 526. Holes 544, 546, 548 are made in support rod holder 540 to be sized and positioned to slidably receive ends of respective ones of the axial support rods 522, 524, 526. The support rods 522-526 are preferably straight and have through-holes drilled through their sidewalls near their ends, so as to received clevis pins (not shown; see FIG. 8) after insertion of the rods through respective holder holes 544-548. In an alternative embodiment (not shown); see FIG. 3) the rods are threaded on the ends, so as to threadably receive female threaded caps after insertion through respective holder holes 544-548.

Similarly, in a use configuration a vertical elongate rear support rod holder 600 (FIG. 6) has a lower end 602 affixed to rear plate 538 as by riveting, welding or (preferably) user-operable fasteners such as studs 543 received into respective keyed slots 545. The rear support rod holder extends upwardly from the rear panel 538 at least beyond the horizontal level of the third support rod 526. Holes 604, 606 and 608 are made in support rod holder 600 and are sized and positioned to slidably receive rear ends of the respective ones of the axial support rods 522, 524 and 526. Clevis pins (not shown; see FIG. 8) may be inserted through diametrically opposed holes drilled in the sidewalls of the rods near their ends in order to fasten the rods in place. Alternatively caps (not shown; see representative cap 316 in FIG. 3) may be threaded onto the (in this instance, threaded) rear ends of the support rods 522-526 so as to secure the reel containers 502-520 between rod holders 540 and 600.

In a preferred embodiment, the front panel 536 and the rear panel 538 extend upwardly beyond the level of the lowest axial support rod 522. Holes 551, 650 are made in the front and rear panels 536, 538 to slidably receive therethrough the axial support rod 522. Extending the front and rear panels 536, 538 upwardly in this manner obviates any transverse deflection of the support rod holders 540, 600 at this height, and enhances the resistance to such deflection at locations higher up on the support rod holders 540, 600. The upward extension of front and rear panels 536, 538 also permits the formation of holes 551, 650 therein to receive the lowest support rod 522 therethrough while the cart 500 is in a storage configuration, as will be hereinafter described.

The bottom panel 530 of the cart 500 has affixed thereto, as by riveting or welding, two front casters 550 which turn on their vertical axes, and two rear casters 552 which don't. In one embodiment some or all of the casters 550-552 may be of the type which are equipped with foot-actuated brakes (not shown), so that the cart 500 may be parked in one place.

At the front corner of left panel 532 and front panel 536 there is provided a left socket 554, which may be joined to left panel 532 and front panel 536 by welding. Similarly, at the front corner of right panel 532 and front panel 536 there is provided a right socket 556. Sockets 554 and 556 are vertical cylindrical sleeves meant to slidably receive respective left and right legs 558, 560 of a handle 562.

Figure 7:
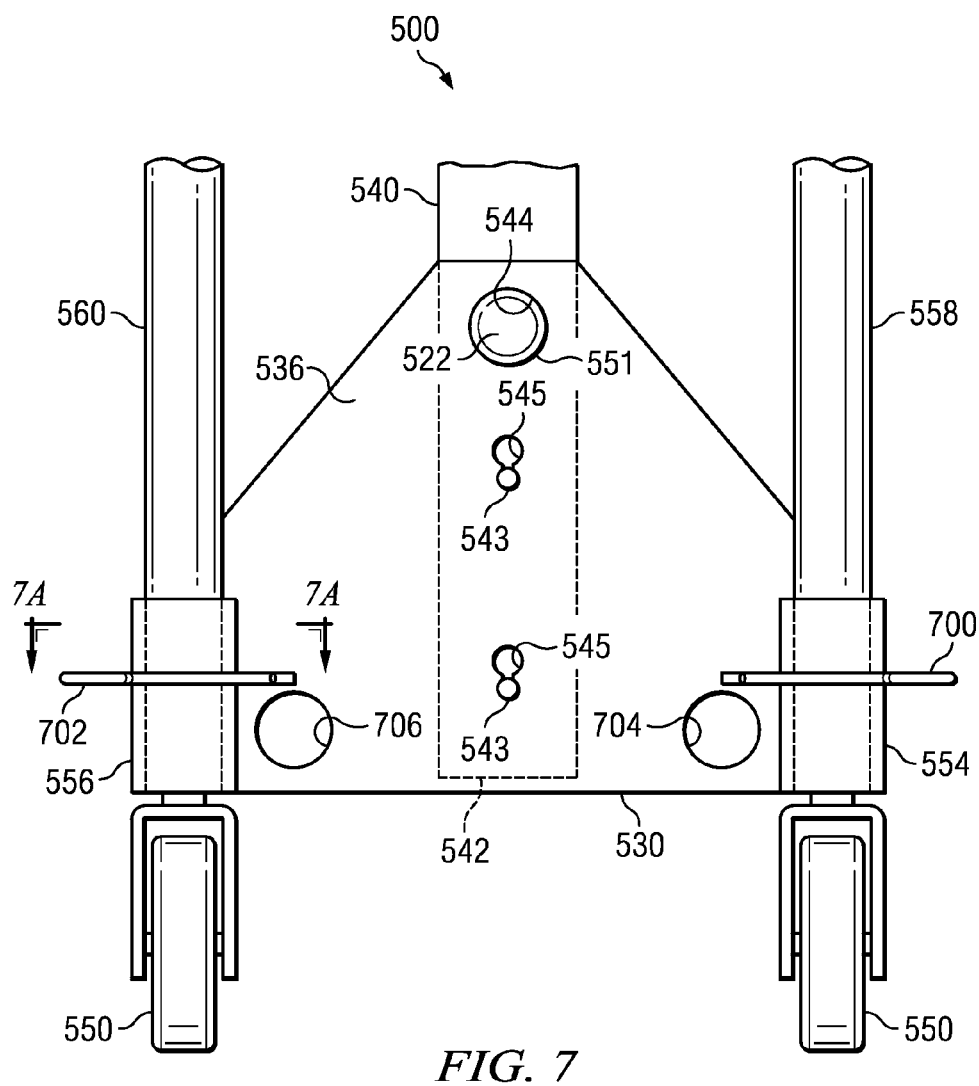
FIG. 7 is a detail of the front of the cart shown in FIG. 5.
Figure 7A:
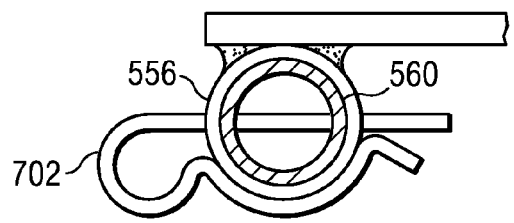
FIG. 7A is a detail sectional view taken substantially along line 7A-7A of FIG. 7.

As shown in the detail of FIG. 7, the left and right legs 558, 560 of the handle 562 can be affixed to respective sockets 554, 556 by means of cotter or clevis pins 700, 702. A shaft of each clevis pin 700, 702 is inserted into a hole in a respective socket 554 or 556, a hole in a respective handle leg 558, 560, a hole in the opposite wall of handle leg 558 or 560 (which conveniently can be formed of tubular steel), and finally through an inboard hole in a respective socket 554 or 556. Another, curved leg of each clevis pin 700, 702 meanwhile fits around the curved external surface of socket 554 or 556, thereby locking the pin 700 or 702 in place.

FIG. 7 also provides a close-up view of left and right storage holes 704, 706 which are not used when the cart 500 is loaded with cartons, but which are used to receive ends of support rods 524, 526 when the cart 500 is being separately transported or stored.

Figure 8:
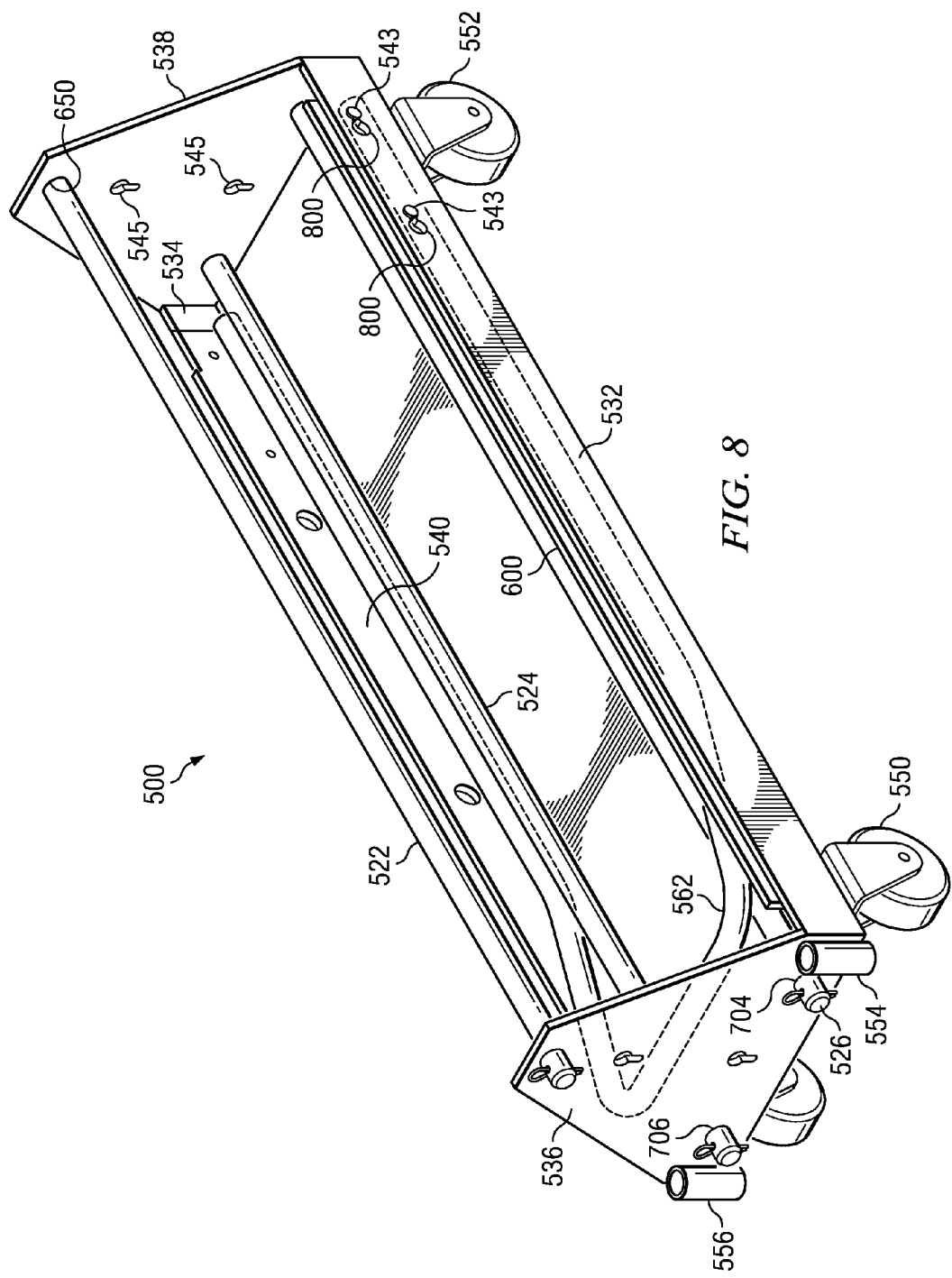
FIG. 8 is an isometric view of the cart shown in FIG. 5, in a folded or "broken down" condition in which it can be easily transported or stored.

FIG. 8 shows cart 500 in a "knocked down" condition. The support rod holders 540, 600 are stored on the left and right sides of the cart interior. Keyed storage slots 800 are formed in sides 532, 534 so as to receive studs 543 of the support rod holders 540, 600, affixing them in place in a storage configuration. Support rods 526, 528 are threaded through storage holes 704, 706, and like storage holes in the rear panel 538, and affixed in place as by means of cotter or clevis pins, so they don't slide out. The legs 558, 560 of cart handle 562 are removed from respective sockets 554, 556 and laid into the interior of the cart 500. The lowest support rod 522 is reattached in the same position that it takes when cartons are mounted to it, but is now used as a handle to carry the cart 500.

Returning to FIGS. 5 and 6, cart 500 permits the stacking of containers 502-520 three rows high, and in alternative embodiments (not shown) a fourth or even more rows could be added, as long as the entire cart 500 is not in danger of tipping over. The containers 502-520 have a lessened danger of tipping over when cable is pulled from them than they otherwise would, as during a cable pull the cable is being pulled off of rotating spools 202 internal to the cartons 502-520. The rotation of spools in the cartons 502-520 around their respective axes relieves most of the tension caused by pulling the cables, and as such the shear force experienced by the whole structure will be less than it otherwise would be. The combination of the cart 500 and the containers 502-520 create a wall or two-dimensional array of reels from which cable may be pulled.

In use, the installer installs one, two or three rows of containers 502-520 on cart 500, employing one, two or three axial support rods 522-526. If only one row of containers 502-508 is to be used, the support rod holders 540 and 600 aren't necessary and don't have to be installed. Otherwise the support rod holders 540 and 600 are bolted on or otherwise fastened to the front and rear plates 536 and 538, preferably in advance of loading a first row of reel containers 502-508 onto the bottom plate 530. The lowest support rod 522 is then threaded through plate 536, support rod holder 540, containers 502-508, rear plate 538 and rear support rod holder 600, and is fastened in place by means of threaded end caps (not shown) or clevis pins. Then, a second row of containers 510-514 is installed in a similar manner, using second support rod 524. If needed, a third row of containers 516-520 is installed using third support rod 526. Legs 558, 560 of the handle 562 are then installed in respective sleeves 554 and 556.

The cart 500 is then rolled to a desired location and is parked (as by setting its caster brakes) such that its long axis (and therefore the axes of the support rods) is at a substantial angle (such as a right angle) to the direction of cable pull. The combined mass of cart 500 and its payload provides a massive anchor against which cable can be pulled out of containers 502-520 through slots 22.

FIGS. 9-12 depict an embodiment permitting the dispensing of cable from each reel in a vertical stack of containers 900A, 900B. Each container 900A,B is like container 10 (FIG. 1) in most respects and each such container 900A, 900B houses a reel 202A, 202B of cable as supported by reel caddies or mounting plates (omitted from FIGS. 9-12 for clarity). Each container 900A,B has an arbor hole 28A or 28B in each of its side panels and a clear passageway between them, as before. Each container 900A,B further has a front panel cable dispensing slot 22.

The containers 900A,B are different from containers 10 in that each additionally has an elongate top pass-through slot 902A or 902B in a top panel 904 thereof, and an elongate bottom pass-through slot 906A, 906B in a bottom panel 908 thereof. The top pass-through slot 902A, 902B should be positioned in top panel 904 in a way which is similar to the positioning of bottom pass-through slot 906A, 906B in bottom panel 908. This is so a top pass-through slot 902A in one container 900A will communicate with a bottom pass-through slot 906B in the container 900B immediately on top of it. As in front slots 22, it is preferred that top and bottom slots 902A,B, 906A,B be offset from the middle of the panel and to be parallel to but offset from the vertical plane which the reel axes will tend to occupy. Said another way, a plane containing the centers of all pass-through slots 902-906 in the stack will be parallel to but spaced from the plane containing the reel axes in the stack.

The pass-through slots 902A,B, 906A,B permit cables from different reels to exit out the top one of the slots 902B in common. By way of example, in FIG. 9 a first cable 910 originates from a lower cable reel 202A. The cable 910 is fed through a pass-through slot 902A prior to the upper container 900B being placed all the way onto the lower container 900A. The cable 910 is fed through the bottom pass-through slot 906B in the upper container 900B, and thence out the top pass-through slot 902B. A cable 912 originates from an upper reel 202B, and is simply threaded out of the top slot 902B. The wide extent of the slots 902A,B, 906A,B allows multiple cables 910, 912 (only two such shown here) to be pulled out of the top of the stack with little resistance and with little interference with each other.

Figure 10:
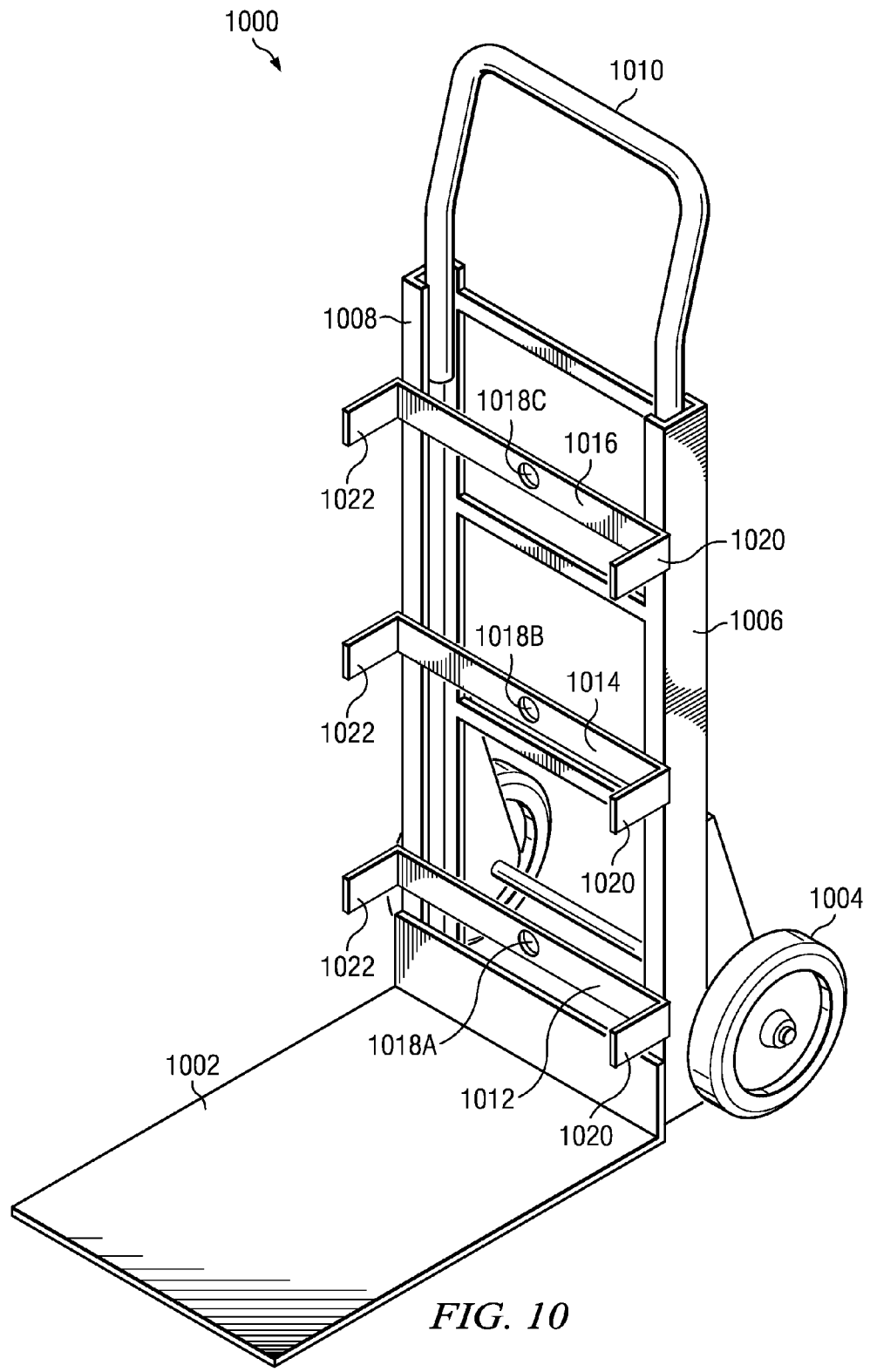
FIG. 10 is an isometric view of two-wheeled hand truck or dolly for use with the cartons shown in FIG. 9.

FIG. 10 shows a two-wheeled dolly or hand truck 1000 adapted to receive and hold at least one vertical stack of the containers 900A,B. The hand truck 1000 has a bottom shelf 1002 which will receive most or all of the weight of the containers, wheels 1004, a left vertical frame member 1006 and a right vertical frame member 1008, both extending upwardly from the shelf 1002. The left and right vertical frame members 1006, 1008 may be terminated at their upper ends by a handle 1010 which may, as shown, join together the vertical frame members 1006, 1008.

The hand truck 1000 further includes horizontally disposed cross members 1012, 1014, 1016 each of which join together and bridge vertical frame members 1006 and 1008. The elevations of the cross members 1012, 1014 and 1016 are chosen to be at about the centers of the first, second and third containers stacked on the shelf 1002; the containers (such as containers 900A,B in FIG. 9) should therefore be of uniform height, even if they can be of different widths. In the center of each elongate horizontal cross member 1012-1016 there is formed a hole 1018A, 1018B, 1018C for the receipt of a respective support rod, as will be described below.

Preferably at the same elevations as horizontal cross members 1012-1016 are left and right side retaining plates 1020, 1022. Each side retaining plate 1020 or 1022 is joined to one of the vertical frame members 1006 and 1008, has a flat and vertical inwardly facing surface, and extends forwardly therefrom in a direction orthogonal to the plane in which cross members 1012-1016 reside. The retaining plates 1020, 1022 help keep the containers mounted the cart 1000 from sliding off in a transverse direction.

Figure 11:
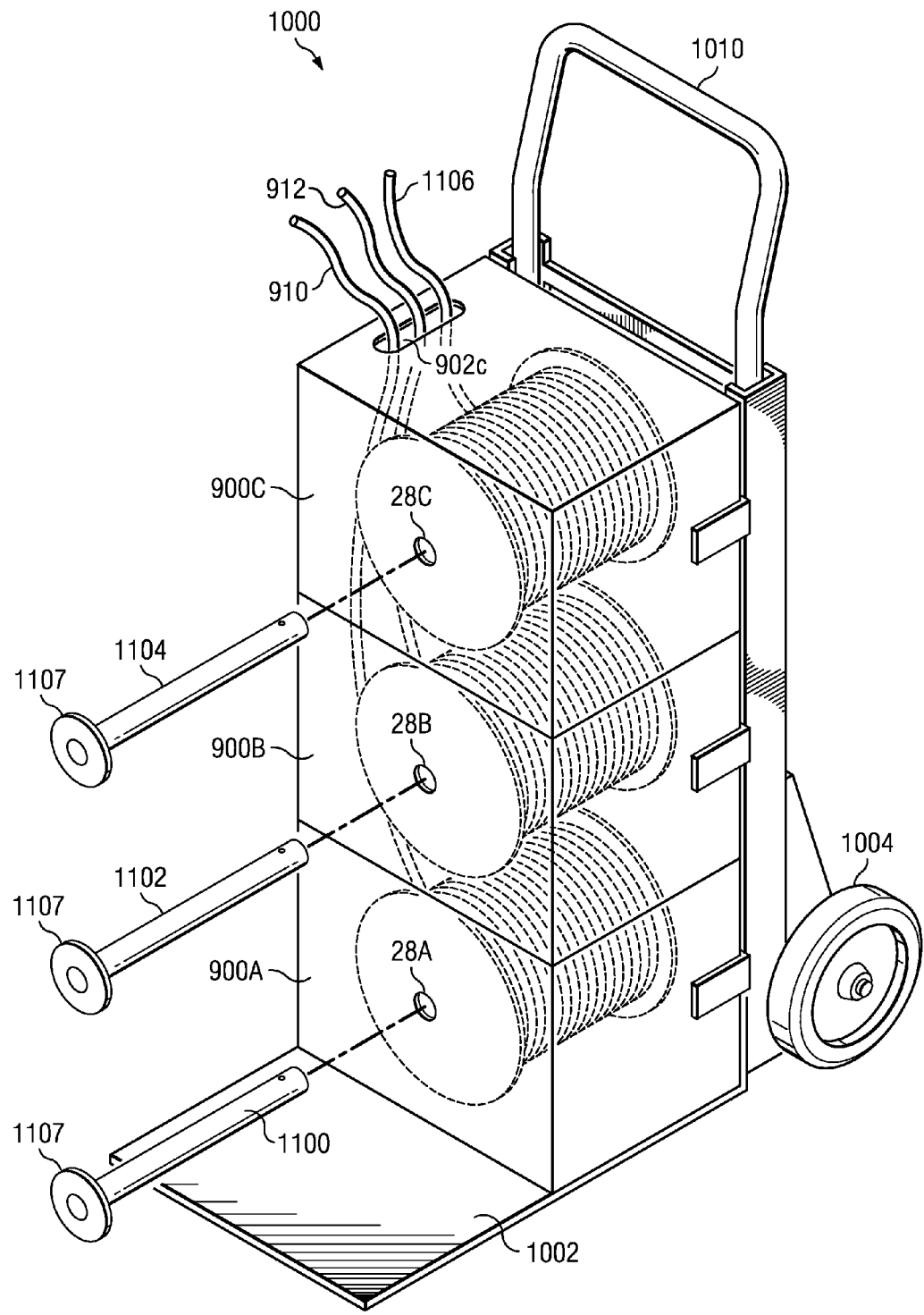
FIG. 11 is an exploded isometric view of the hand truck shown in FIG. 10, showing the loading of a single stack of cartons.

FIG. 11 shows cart 1000 as holding a single stack of the containers 900A-900C. For this use a set of relatively short support rods 1100, 1102 and 1104 are used to mount the containers 900A-900C to the cart 1000. First, a container 900A is placed on shelf 1002. If vertical dispensing is desired from this stack, a cable 910 from container 900A is threaded through a top pass-through slot such as 902A in FIG. 9, and thence into a bottom slot 906B in container 900B. Container 900B is then stacked on container 900A. A cable or conductor 912 is threaded through a top pass-through slot 902B together with cable 910. Then both cables 910, 912 are fed through a bottom pass-through slot (not shown; similar to slots 906A,B) in a third container 900C. Container 900C is then placed on top of container 900B. Cables 910 and 912, respectively originating from containers 900A and 900B, are joined by a further cable or conductor 1106 and all are threaded through a top pass-through slot 902C.

To firmly secure the containers 900A-C to the hand truck 1000, rod 1100 is inserted through arbor hole 28A, rod 1102 is inserted through arbor hole 28B and rod 1104 is inserted through arbor hole 28C. The rods 1100-1104 continue to be inserted through the caddy holes, reel flange holes, and communicating reel passageways to and through the opposing carton sides and into and through respective cross member holes 1018A, 1018B and 1018C. The inserted ends of the rods 1100-1104 may be drilled to receive respective clevis pins (not shown) to prevent their withdrawal. At the other end thereof, each of the rods 1100-1104 has an enlargement 1106 (such as a disk) that is large enough to not be admitted into a respective arbor hole 28A-C, and which is also large enough to sufficiently distribute some of the weight of the loaded container (which the rod enlargement 1106 may experience if the hand truck 1000 is tipped forwardly) throughout its disk area without tearing or "perforating through" the typically cardboard carton panel which will be pressing against it.

Figure 12:
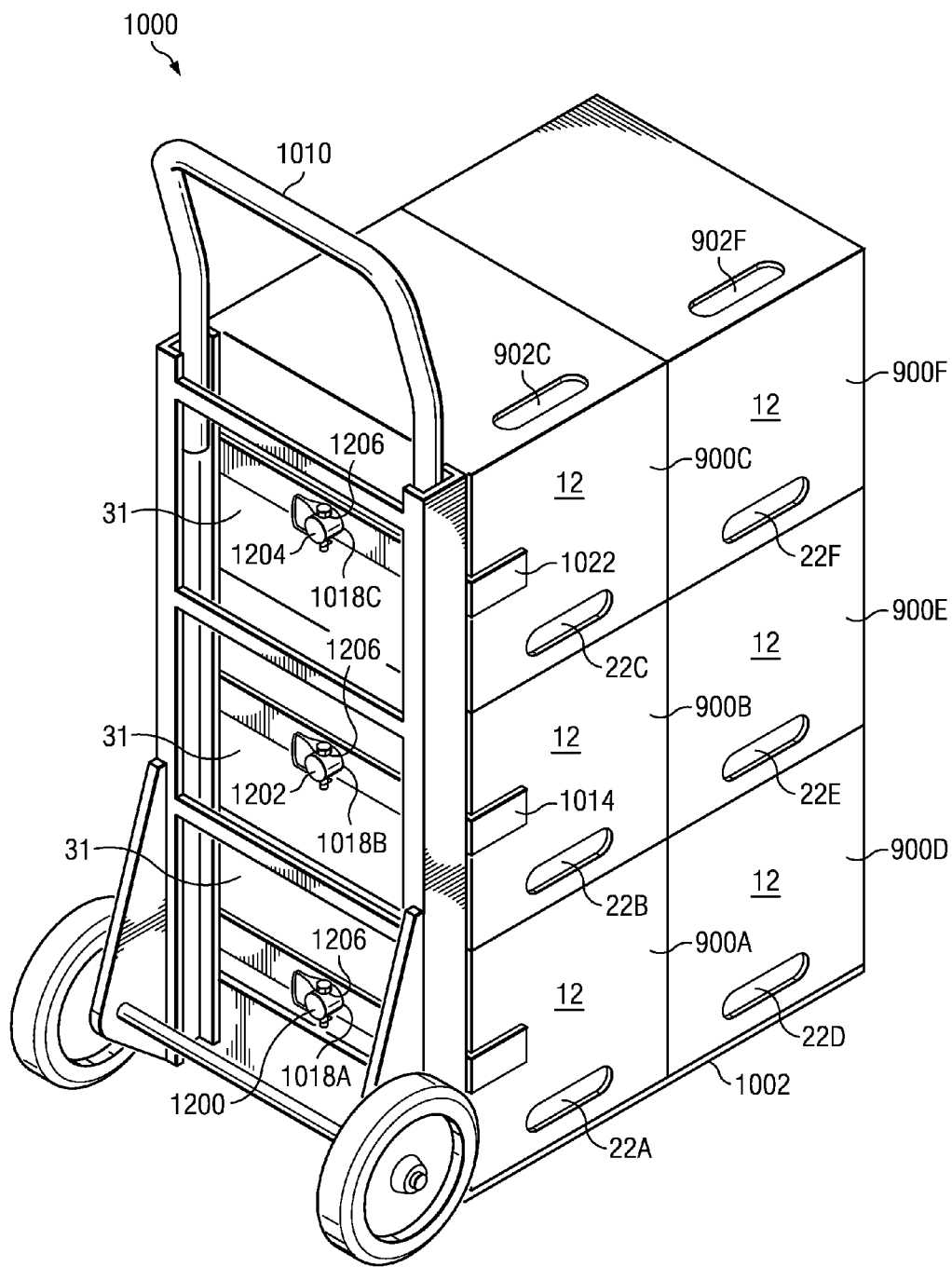
FIG. 12 is an isometric view from another angle of the hand truck shown in FIG. 10, as shown with two stacks of cartons.

FIG. 12 shows hand truck 1000 as loaded with two stacks of containers 900A-C and 900D-F. The reel axis inside of container 900A should be substantially coaxial with the reel axis inside of container 900D, and this coaxial pairing should also take place for containers 900B, 900E and 900C, 900F. This will create a continuous straight passageway for an axial rod 1200, 1202 or 1204 from a cross member hole 1018A-C, through all intervening carton walls, caddies, reel flanges and reel passageways, and out an arbor hole 28 located on the remote side of the remoter one 900D-F (with respect to the cross member) of the two containers. Axial rods 1200-1204, which are in general similar to axial rods 1100-1104 but longer, can be inserted through respective ones of these continuous horizontal passageways. A remote end of each of the axial rods 1200-1204 will have an enlargement like enlargement 1107 on rods 1100-1104, and a near end of the axial rods 1200-1204 will be drilled to receive a respective clevis pin 1206 after the near end has been inserted through a respective one of the cross member holes 1018A-C.

The cables from the reels inside of containers 900A-C may be fed through a top pass-through slot 902C, after being threaded through zero, one or two intervening pairs of pass-through slots in the containers 900A-C, depending on the identity of the reel from which the cable is being paid off. Alternatively, the cables from respective containers 900A-C may be threaded in parallel out respective front slots 22A, 22B, 22C. Cable from containers 900D-F may similarly all be drawn through top pass-through slot 902F, or alternatively through the front slots 22D, 22E and 22F thereof. The way in which cable is drawn from each stack may be the same as the way used for the other stack, or intentionally may be chosen to be different.

The pass-through-slotted containers 900A-F may also be used with the four-wheeled cart 500, with cables drawn out of top pass-through slots in the top row of containers affixed together by top support rod 526.

In summary, a cable container has been provided in which a reel of cable rotates freely on caddies inside of a carton as cable is being drawn out of an offset elongate slot provided for this purpose. With the aid of an axial support rod threaded through multiple ones of these containers, two or more such containers can be combined into a single mobile cable pulling unit. For larger jobs, a cart is provided by which multiple rows of such containers are secured to the cart by respective axial support rods. A dolly or hand truck is also provided to create one or two stacks of these containers, and pass-through slots may be formed in the stacked containers to permit the pulling of all cables in the stack in a vertical direction out of one top slot.

While illustrated embodiments of the present invention have been described and illustrated in the appended drawings, the present invention is not limited thereto but only by the scope and spirit of the appended claims.

We claim:

1. A system for dispensing electrical or communications cable comprising:
  a first container including
    a first carton having a first bottom panel with left and right sides, an upstanding first left panel of the first carton joined to the left side of the first bottom panel, an upstanding first right panel joined to the right side of the first bottom panel;
    a first cable reel including an elongate first spindle on which electrical or communications cable is wound, the first spindle having opposed left and right ends, the first spindle adapted to rotate around a horizontal axis spaced from and parallel to the first bottom panel of the first carton;
    a first left support disposed above the first bottom panel for rotatably supporting the left end of the first cable spindle off of the first bottom panel of the first carton, a first right support disposed above the first bottom panel for rotatably supporting the right end of the first cable spindle;
  a second container including
    a second carton having a second bottom panel with left and right sides, an upstanding second left panel of the second carton joined to the left side of the second bottom panel, an upstanding second right panel joined to the right side of the second bottom panel;
    a second cable reel including an elongate second spindle on which electrical or communications cable is wound, the second spindle having opposed left and right ends, the second spindle adapted to rotate around the horizontal axis;
    a second left support disposed above the second bottom panel for rotatably supporting the left end of the second cable spindle off of the second bottom panel of the second carton, a second right support disposed above the second bottom panel for rotatably supporting the right end of the second cable spindle;
  the right panel of the first container disposed to be proximate to the left panel of the second container, a clear passageway formed around the horizontal axis and through the first left panel of the first carton, the first left support, the first spindle, the first right support, the first right panel of the first carton, the second left panel of the second carton, the second left support, the second spindle, the second right support, and the second right panel of the second carton;
  an elongate rod disposed through the clear passageway and extending at least from the first left panel of the first carton to the second right panel of the second carton;
  a third container disposed to be above and supported by the first container, the third container including
    a third carton having a third bottom panel with left and right sides, an upstanding third left panel of the third carton joined to the left side of the third bottom panel, an upstanding third right panel joined to the right side of the third bottom panel;
    a third cable reel including an elongate third spindle on which electrical or communications cable is wound, the third spindle having opposed left and right ends, the third spindle adapted to rotate around a second horizontal axis spaced from and parallel to the third bottom panel of the third carton;
    a third left support disposed above the third bottom panel for rotatably supporting the left end of the third cable spindle off of the third bottom panel of the third carton, a third right support disposed above the third bottom panel for rotatably supporting the right end of the third cable spindle;
  a fourth container disposed to be above and supported by the second container, the fourth container including
    a fourth carton having a fourth bottom panel with left and right sides, an upstanding fourth left panel of the fourth carton joined to the left side of the fourth bottom panel, an upstanding fourth right panel joined to the right side of the fourth bottom panel;
    a fourth cable reel including an elongate fourth spindle on which electrical or communications cable is wound, the fourth spindle having opposed left and right ends, the fourth spindle adapted to rotate around the second horizontal axis;
    a fourth left support disposed above the fourth bottom panel for rotatably supporting the left end of the fourth cable spindle off of the fourth bottom panel of the fourth carton, a fourth right support disposed above the fourth bottom panel for rotatably supporting the right end of the fourth cable spindle;
  the right panel of the third container disposed to be proximate to the left panel of the fourth container, a second clear passageway formed around the second horizontal axis and through the third left panel of the third carton, the third left support, the third spindle, the third right support, the third right panel of the third carton, the fourth left panel of the fourth carton, the fourth left support, the fourth spindle, the fourth right support, and the fourth right panel of the fourth carton; and
  a second elongate rod disposed through the second clear passageway and extending at least from the third left panel of the third carton to the fourth right panel of the fourth carton.

2. The system of claim 1, further comprising an arbor hole formed around the horizontal axis in each of the first left panel, the first right panel, the second left panel, and the second right panel, the clear passageway extending through each of the arbor holes.

3. The system of claim 2, wherein each arbor hole further comprises an edge, at least a portion of the edge being perforated.

4. The system of claim 1, wherein each left support includes a left bushing, each right support includes a right bushing, each cable reel includes a left flange with a left central hole on one of the horizontal axis and the second horizontal axis and a right flange with a right central hole on one of the horizontal axis and the second horizontal axis, the left and right central holes being sized such that each of the left and right bushings are insertable into its respective central hole.

5. The system of claim 4, wherein each left bushing is affixed to a left caddy disposed in the carton to be adjacent to its respective left panel and to extend upwardly from an upper surface of the respective bottom panel and each right bushing is affixed to a right caddy disposed in the carton to be adjacent to its respective right panel and to extend upwardly from the upper surface of the respective bottom panel.

* * * * *